United States Patent [19]

Wittren

[11] 4,367,803
[45] Jan. 11, 1983

[54] STEERING SYSTEM

[75] Inventor: Richard A. Wittren, Cedar Falls, Iowa

[73] Assignee: Deere & Company, Moline, Ill.

[21] Appl. No.: 244,394

[22] Filed: Mar. 16, 1981

[51] Int. Cl.³ .............................. B62D 5/10; F15B 9/02
[52] U.S. Cl. ...................................... 180/153; 60/385; 92/108
[58] Field of Search .................. 180/152, 153; 60/385, 60/386; 92/108

[56] References Cited

U.S. PATENT DOCUMENTS

| | | | |
|---|---|---|---|
| 2,664,859 | 1/1954 | Green | 121/38 |
| 3,016,708 | 1/1962 | Gordon et al. | 60/386 |
| 3,200,596 | 8/1965 | Olson et al. | 60/54.5 |
| 3,556,242 | 1/1971 | Dollase | 180/79.2 |
| 3,710,689 | 1/1973 | Henderson | 91/388 |
| 3,949,650 | 4/1976 | Blatt et al. | 92/108 |
| 4,161,865 | 7/1979 | Day | 60/385 |

Primary Examiner—Joseph F. Peters, Jr.
Assistant Examiner—Donn McGiehan

[57] ABSTRACT

A hydrostatic power steering system with constant volume feedback compensation including first and second steering cylinders. Each cylinder has a housing containing a piston with an attached piston rod extending through one end of the housing. The pistons and piston rods form a head chamber and two feedback chambers within each of the cylinders. The outer ends of the piston rods are connected to a pair of steerable wheels and also to each other by a mechanical link which allows the piston rods to move simultaneously. A control valve is also present which selectively controls the passage of a pressurized fluid from a supply source to a head chamber of either of the cylinders. The cylinders, which have their feedback chambers fluidly connected together, are manually operated by a steering wheel which actuates a metering pump connected across the fluid passages. As the steering wheel is turned, the fluid is transferred among the various chambers of the steering cylinders causing the piston rods to extend and retract, thereby turning the wheels.

10 Claims, 3 Drawing Figures

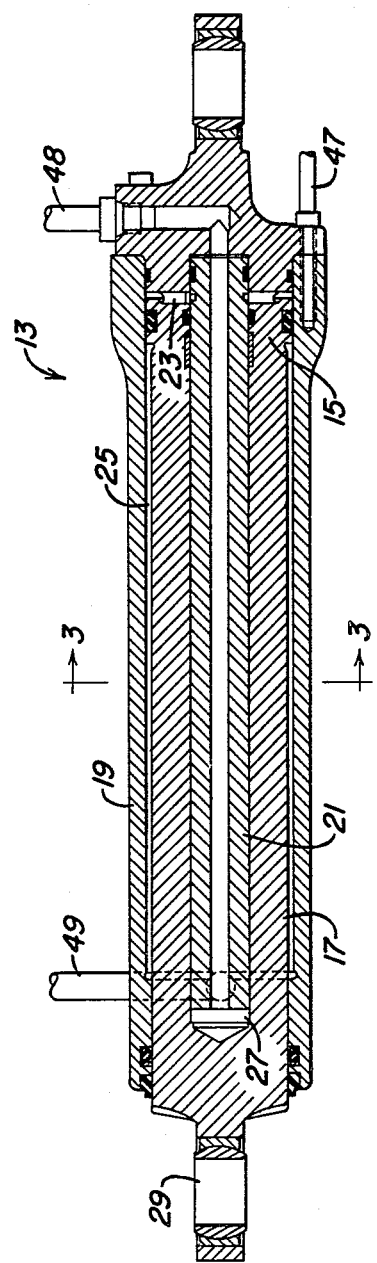
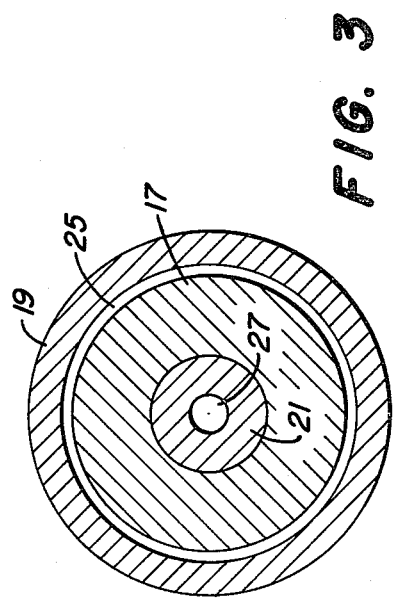

STEERING SYSTEM

BACKGROUND OF THE INVENTION

1. Field of the Invention

This invention relates to a steering system for vehicles, and more particularly to a hydrostatic power steering system with constant volume feedback compensation.

2. Description of the Prior Art

The use of hydraulic steering cylinders to control the position of the steerable wheels on a vehicle especially off-road type vehicles, is commonplace. Normally, a mechanical linkage is employed which connects the two steering arms together in such a manner as to cause the outside wheel to generate a greater turning radius than the inside wheel. Since it is also common practice to connect the steering cylinders to extensions of the steering arms, the cylinders experience differences in piston velocities during a steering cycle. In those instances where a hydraulic feedback signal is derived from one of the working chambers of each of a pair of double-acting cylinders, any noticeable difference in piston velocities can be detrimental to the control of the vehicle. The two major problems with unequal piston velocities are a rise of internal pressure within the system and an increase in needed effort to steer the vehicle. Now a steering system which incorporates a pair of three chamber hydraulic cylinders has been invented which automatically compensates for the difference in piston velocities to maintain a constant volume feedback circuit.

SUMMARY OF THE INVENTION

Briefly, this invention relates to a hydrostatic power steering control system with constant volume feedback compensation. The steering control system includes first and second hydraulic cylinders having a housing which contains a piston and an attached piston rod which extends through one end of the housing. The outer ends of the piston rods are connected to a pair of steerable wheels and also to each other by a mechanical linkage which allows the piston rods to move in unison. Within each of the housings, the piston and piston rods form a head chamber and two feedback chambers. The head chambers are connected by passages to a pressurized fluid source and the feedback chambers of the first cylinder are connected to two feedback chambers of the second cylinder. A control valve is positioned between the fluid source and the cylinders to selectively control the passage of the pressurized fluid to a head chamber of either of the cylinders. Movement of the control valve is caused by pressure differences in the passages which connect the feedback chambers of the two cylinders. A pressure difference is created by turning a manually operable steering wheel which actuates a metering pump attached across the feedback passages. Movement of fluid through the metering pump causes a pressure difference across the control valve. As the control valve is repositioned, pressurized fluid enters into one of the head chambers of one of the cylinders and forces the respective piston rod to extend outward. This outward movement is relayed through the mechanical linkage and causes the other piston rod to retract thereby allowing the wheels to turn in a similar direction.

The general object of this invention is to provide a hydrostatic power steering system with constant volume feedback compensation. A more specific object of this invention is to provide a hydrostatic power steering system which utilizes a pair of three chambered steering cylinders to obtain constant volume feedback even when the relative velocities of the pistons within the cylinders are different.

Another object of this invention is to provide a steering system with constant volume feedback compensation which is simple in construction and economical to build.

Still another object of this invention is to provide a steering system with constant volume feedback compensation which provides complete symmetry of sterring ratio about a straight ahead position.

A further object of this invention is to provide a steering system with constant volume feedback compensation which uses two feedback chambers within each of a pair of steering cylinders which allows displacement of an equal volume of fluid between the cylinders during each piston stroke.

Other objects and advantages of the present invention will become more apparent to those skilled in the art in view of the following description and the drawings.

BRIEF DESCRIPTION OF THE DRAWINGS

FIG. 2 is a cross-sectional view of one of the steering cylinders depicted in FIG. 1 showing a head chamber and two feedback chambers.

FIG. 3 is an end view of FIG. 2 along line 3—3.

DETAILED DESCRIPTION OF THE PREFERRED EMBODIMENT

Figure 1:
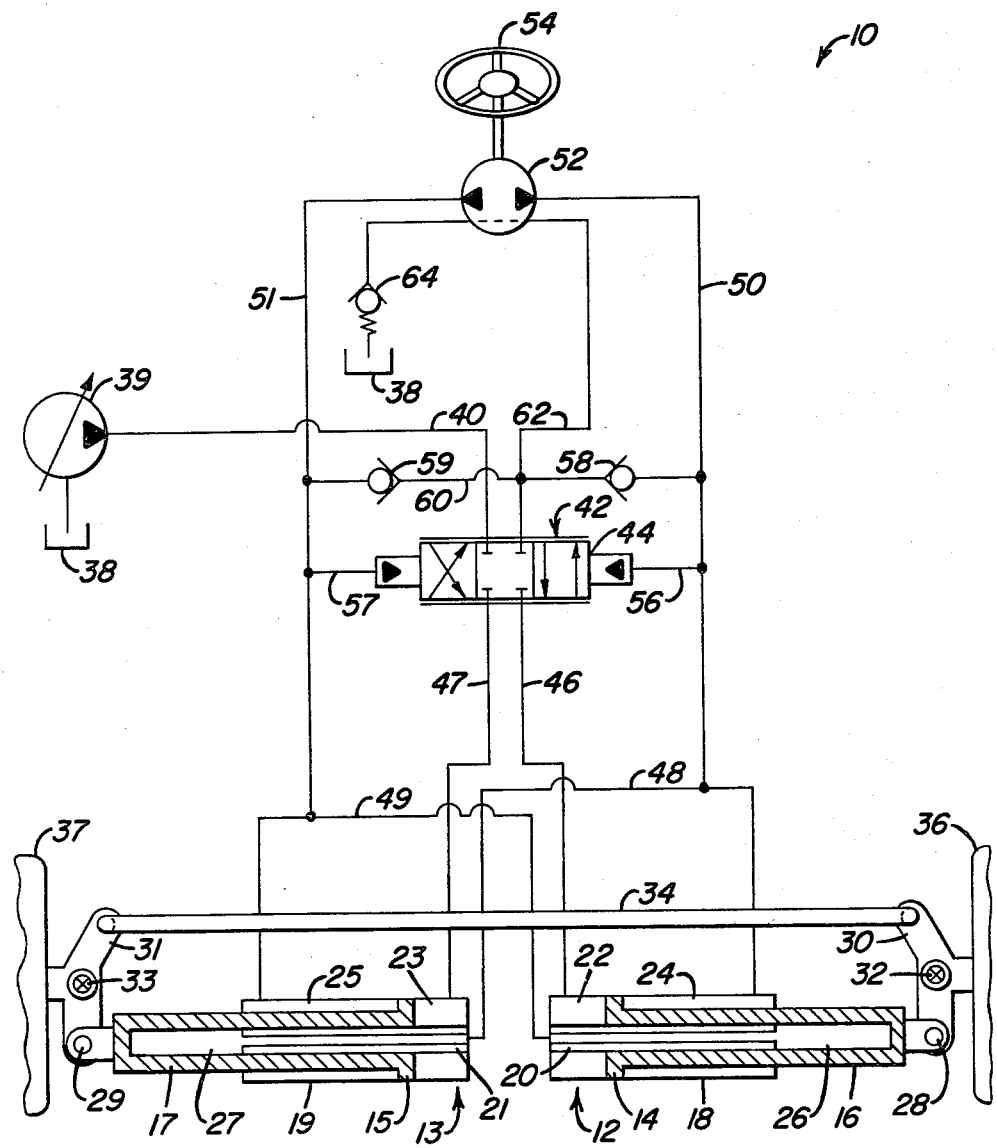
FIG. 1 is a schematic view of a hydrostatic power steering system with constant volume feedback compensation.

Referring to FIGS. 1–3, a hydrostatic power steering system 10 is shown having constant volume feedback compensation. The steering system 10 includes first and second hydraulic cylinders, 12 and 13 respectively, each having a piston head 14 and 15 with an attached hollow piston rod 16 and 17 movably positioned within a housing 18 and 19, respectively. A stationary elongated tubular member 20 and 21 is also present within each of the housings 18 and 19 and each cooperates with the respective piston heads 14 and 15 and the piston rod 16 and 17 to form three internal fluid chambers (see FIGS. 2 and 3). The three chambers within each of the cylinders 12 and 13 are hereinafter referred to as head chambers 22 and 23, first feedback chambers 24 and 25 and second feedback chambers 26 and 27, respectively. Preferably, the working volume of the feedback chambers 24 and 26 of the first cylinder 12 is equal to the working volume of the feedback chambers 25 and 27 of the second cylinder 13.

An outward end 28 and 29 of each of the piston rods 16 and 17 is connected to one end of support arms 30 and 31, respectively, which pivots about a point 32 and 33, respectively. The support arms 30 and 31 are attached together by a mechanical link 34. Preferably, the mechanical link 34 is connected to the support arms 30 and 31 on the opposite side of the pivot points 32 and 33 to where the piston rods 16 and 17 are attached. The support arms 30 and 31 together with the mechanical link 34 form what is conventionally known as an Ackerman linkage. A pair of steerable wheels 36 and 37 are also attached to the support arms 30 and 31, respectively, in a commonly known manner.

Fluid to actuate the hydraulic cylinders 12 and 13 is contained in a reservoir 38. A supply pump 39, which is fluidly connected to the reservoir 38, supplies pressurized fluid through a passage 40 to a control valve 42. The control valve 42, which is preferably a four-way, three position directional control valve, has a movable valve member 44 actuated by pressure differentials. As this movable valve member 44 is shifted within the control valve 42, the incoming pressurized fluid is selectively routed to one of the head chambers 22 or 23 by fluid passages 46 or 47. Additional fluid passages 48 and 49 cross-connect the first feedback chamber 24 of the first cylinder 12 to the second feedback chamber 27 of the second cylinder 13, and the second feedback chamber 26 of the first cylinder 12 to the first feedback chamber 25 of the second cylinder 13, respectively. This method of cross-connecting the two cylinders 12 and 13 allows for equal area displacement between the two cylinders thereby eliminating pressure fluctuations within the system 10.

The two passages 48 and 49 are further connected together by fluid passages 50 and 51 which have a metering pump 52 and the control valve 42 positioned across them. The metering pump 52 is actuatable by a manually operable steering element 54, such as a steering wheel. As the metering pump 54, which is preferably a bi-directional metering pump, is actuated, a pressure differential is created across the passages 50 and 51. This pressure difference is sensed by the pressure responsive actuator part of the control valve 42 via fluid passages 56 and 57 which connect to the fluid passages 50 and 51. The pressure differential created across the passages 50 and 51 will cause the movable valve member 44 of the control valve 42 to shift from its neutral position to a position which allows passage of pressurized fluid from the supply pump 39 to one of the head chambers 22 or 23 of the cylinders 12 and 13, respectively. Also, fluid in the head chamber 22 or 23 which is not connected to the supply pump 39 is routed back through the control valve 42 to the reservoir 38 via a return line 62.

The steering control system 10 further includes a pair of makeup valves 58 and 59 which are positioned across an intermediate fluid passage 60. This intermediate passage 60 is fluidly connected to the fluid passages 50 and 51 and also to the return line 62. A low pressure relief valve 64 is positioned across the return line 62 so as to maintain a positive pressure in the return line 62 at all times. The makeup valves 58 and 59, which allow fluid flow through them in only one direction toward the respective fluid passages 50 and 51, are normally closed. These makeup valves 58 and 59 are set to open at a lower pressure than that needed to open the pressure relief valve 64. This is to insure that adequate fluid is always present in the fluid passages 50 and 51.

As shown in FIG. 1, the return line 62 is constructed to pass through the metering pump 54. This configuration enables the heat contained in the fluid in the return line 62 to be transferred to the fluid flowing through the metering pump 54. This transfer of heat improves the operation of the steering control system 10 in cold weather.

Operation

The operation of the steering control system 10 will now be explained starting from a position wherein the wheels 36 and 37 are aligned straight ahead. With the engine of the vehicle running, the supply pump 39 will draw and pressurize fluid from the reservoir 38 and direct it through the passage 40 to the control valve 42. Since the movable valve member 44 of the control valve 42 is in a neutral position, no fluid will be able to pass to the cylinders 12 and 13. Upon turning the steering wheel 54, a pressure difference is created by the metering pump across the passages 50 and 51. This pressure difference is sensed by the movable valve member 44 through the fluid passages 56 and 57 and this pressure difference will cause the movable valve member 44 to shift towards the lower pressurized passage. For example, if the steering wheel 54 is turned for a left-hand turn, the metering pump 52 will draw fluid from the passage 50 and force it into the passage 51. This creates a pressure differential in the passages 56 and 57 which forces the movable valve member 44 to the right. With the movable valve member 44 shifted to the right, the pressurized fluid from the supply pump 39 passes through the control valve 42 and the passage 46 to the head chamber 22 of the first cylinder 12. At the same time, fluid from the head chamber 23 of the second cylinder 13 is free to pass through the fluid passage 47 and the control valve 42 into the return line 62 and eventually to the reservoir 38.

Pressurized fluid entering the head chamber 22 will force the piston 14 and the associated piston rod 16 outwardly to turn the wheels 36 and 37 in a left-hand direction. This extension of the first cylinder 12 causes an increase in volume in the feedback chamber 26 and a decrease in volume in the feedback chamber 24. As the first cylinder 12 is extended, the second cylinder 13 will be retracted due to the mechanical connection provided by the support arms 30 and 31 and the mechanical link 34. Retraction of the second cylinder 13 causes an increase in volume in the feedback chamber 25 and a decrease in volume in the head chamber 23 and the feedback chamber 27. Fluid force from the head chamber 23 of the second cylinder 13 flows to the reservoir 38 while fluid forced from the feedback chambers 24 and 27 flows through the passage 48 to the fluid passage 50. If movement of the steering wheel 54 is continued, fluid from the fluid passage 50 is transferred through the metering pump 52 to the fluid passages 51 and 49 and the feedback chambers 25 and 26. If movement of the steering wheel 54 is stopped, fluid from the feedback chambers 24 and 27 which enters the fluid passage 50 will cause a pressure build-up in the fluid passage 56, and this increase in pressure will return the movable valve member 44 to its neutral position within the control valve 42. The control system 10 will stay in this neutral condition until further movement, in either direction, of the steering wheel 54.

It should be noted that the different velocities of the piston rods 16 and 17 are compensated for by the interconnections of the four feedback chambers 24–17. In the example above, as the feedback chambers 24 and 27 are decreasing in volume, the exiting fluid is circulated through the passages 48 and 50 to the passages 51 and 49 so as to fill the expanding feedback chambers 25 and 26. However, leakages may occur in the control system 10, especially at the metering pump 52. For this reason, the makeup valves 58 and 59 are set to open at a lower pressure than the pressure relief valve 64. When the fluid pressure within either of the passages 50 or 51 falls below the minimum pressure needed to open the makeup valves 58 and 59, the respective makeup valve will open and allow pressurized fluid to flow from the return line 62 into the passage 50 or 51. This assures that the steering control system 10 will always be at a positive pressure.

Turning the steering wheel 54 for a right-hand turn will cause the fluid flow through the metering pump 52 to be in a reverse direction. This will result in steering the wheels 36 and 37 in an opposite direction.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A steering system comprising:
   (a) first and second steering cylinders each having a piston with a piston rod extending through one end thereof and each cylinder having a head chamber and first and second feedback chambers;
   (b) link means for connecting said first and second cylinders to a pair of steerable wheels so that said cylinders can operate simultaneously;
   (c) a fluid reservoir;
   (d) a supply pump connected to said reservoir for supplying pressurized fluid to said head chambers of said cylinders;
   (e) a plurality of passage means, a first for fluidly connecting said first feedback chamber of said first cylinder to said second feedback chamber of said second cylinder, a second for fluidly connecting said second feedback chamber of said first cylinder to said first feedback chamber of said second cylinder, and a third for fluidly connecting together said first and second passage means;
   (f) valve means for selectively controlling the flow of said pressurized fluid from said supply pump to said head chambers of said steering cylinders, said valve means connected across said third passage means and actuatable by pressure differences in said third passage means;
   (g) a metering pump connected across said third passage means for facilitating movement of said fluid between said feedback chambers of said first and second cylinders and thereby causing a pressure difference across said third passage means; and
   (h) a manually operable steering element connected to said metering pump for controlling the steering of said wheels.

2. A steering system for a vehicle having a pair of steerable wheels attached to pivotable support arms and joined together by a mechanical link, said system comprising:
   (a) first and second steering cylinders each having a piston with an attached piston rod extending through one end thereof and each cylinder having a head chamber and first and second feedback chambers;
   (b) a fluid reservoir;
   (c) a supply pump connected to said reservoir for supplying pressurized fluid to said head chambers of said cylinders;
   (d) a plurality of passage means, a first for fluidly connecting said first feedback chamber of said first cylinder to said second feedback chamber of said second cylinder, a second for fluidly connecting said second feedback chamber of said first cylinder to said first feedback chamber of said second cylinder, and a third for fluidly connecting together said first and second passage means;
   (e) control valve means for selectively controlling the flow of said pressurized fluid from said supply pump to said head chambers of said cylinders, said control valve means connected across said third passage means and actuatable by pressure differences in said third passage means;
   (f) a metering pump connected across said third passage means for facilitating movement of said fluid between said feedback chambers of said cylinders and thereby causing a pressure difference in said third passage means; and
   (g) a manually operable steering element connected to said metering pump for controlling the steering of said vehicle.

3. The steering system of claim 2 wherein said control valve means is a directional control valve.

4. The steering system of claim 3 wherein said directional control valve is a four-way, three position directional control valve.

5. The steering system of claim 2 wherein said metering pump is a bi-directional pump.

6. A hydrostatic power steering control system with constant volume feedback compensation, comprising:
   (a) first and second steering cylinders each having a housing containing a piston with a piston rod extending through one end of said housing and each cylinder having a head chamber and first and second feedback chambers;
   (b) mechanical link means for connecting said first and second cylinders to a pair of steerable wheels so that said cylinders can turn said wheels simultaneously;
   (c) a fluid reservoir;
   (d) a supply pump connected to said reservoir for supplying pressurized fluid to said head chambers of said first and second cylinders;
   (e) first and second passage means for fluidly connecting said first feedback chamber of said first cylinder to said second feedback chamber of said second cylinder and said second feedback chamber of said first cylinder to said first feedback chamber of said second cylinder, respectively;
   (f) third passage means for fluidly connecting together said first and second passage means;
   (g) a directional control valve having a movable valve member for selectively controlling the flow of said pressurized fluid from said supply pump to said head chambers of said cylinders, said control valve connected across said third passage means and actuatable by pressure differences within said third passage means;
   (h) a bi-directional metering pump connected across said third passage means for facilitating movement of said fluid between said feedback chambers of said first and second cylinders; and
   (i) a manually operable steering wheel connected to said metering pump for controlling the steering of said wheels.

7. A steering system for controlling movement of a pair of steerable wheels connected together by a mechanical link for simultaneous movement, said system comprising:
   (a) first and second extendable and retractable steering cylinders connected to said mechanical link for moving said link upon extension of either one of said cylinders and retraction of said other cylinder, each of said cylinders having a head chamber and first and second feedback chambers which expand and contract in opposition to each other;
(b) a fluid reservoir;
(c) a source of pressurized fluid;
(d) valve means for selectively controlling flow of fluid from said source to said head chambers of each cylinder and from said head chamber of each cylinder to said reservoir;
(e) first fluid passage means interconnecting said first feedback chamber of said first cylinder with said second feedback chamber of said second cylinder;
(f) second fluid passage means interconnecting said second feedback chamber of said first cylinder with said first feedback chamber of said second cylinder;
(g) metering pump means for transferring fluid between said first and second passage means;
(h) manual steering means for controlling said metering pump means; and
(i) pressure responsive actuator means associated with said valve means responsive to fluid pressure in said first and second fluid passage means to position said valve means in accordance with pressure differences in said first and second fluid passage means.

8. A steering system for a vehicle having a pair of steerable wheels, a steering arm associated with each wheel, and link means interconnecting said steering arms to effect simultaneous movement of said wheels, said steering system comprising:
(a) first and second steering cylinders connected to and acting between said vehicle and said first and second steering arms, respectively, to steer said wheels upon extension of one of said cylinders and retraction of the other, each of said cylinders having a head chamber and first and second feedback chambers which expand and retract in opposition to each other;
(b) manually actuatable metering pump means for transferring fluid between said first feedback chamber of the first cylinder and said second feedback chamber of said second cylinder and said first feedback chamber of said second cylinder and said second feedback chamber of said first cylinder;
(c) a fluid reservoir;
(d) a source of fluid pressure;
(e) control valve means for controlling fluid flow between said source, said head chambers of said cylinders and said reservoir, said control valve means movable from a neutral position where fluid flow is blocked from said source to one of said head chambers and from said other head chamber to said reservoir to a first side of the neutral position in which said source is connected with said head chamber of said first cylinder, and said reservoir is connected with said head chamber of said second cylinder, and a second side of the neutral position in which said source is connected with said head chamber of said second cylinder, and said reservoir is connected with said head chamber of said first cylinder; and
(f) actuator means associated with said control valve means responsive to pressures on opposite sides of said metering pump to move said control valve means to and between its various positions in response to pressure differences.

9. The steering system of claim 8 includes:
(a) first fluid passage means interconnecting said first feedback chamber of said first cylinder with said second feedback chamber of said second cylinder;
(b) second fluid passage means interconnecting said second feedback chamber of said first cylinder with said first feedback chamber of said second cylinder;
(c) third fluid passage means interconnecting said first passage means with a first side of said metering pump; and
(d) fourth fluid passage means interconnecting said second passage means with a second side of said metering pump.

10. The steering system of claim 9 wherein said actuator means is responsive to fluid pressure in said third and fourth fluid passage means.

* * * * *